(12) United States Patent
Woerner et al.

(10) Patent No.: US 7,080,867 B2
(45) Date of Patent: Jul. 25, 2006

(54) COVERING FOR A GAP IN A VEHICLE

(75) Inventors: Helmut Woerner, Ostfildern (DE); Siegfried Stoeckl, Pfeffenhausen (DE); Jochen Bade, Dachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/902,100

(22) Filed: Jul. 30, 2004

(65) Prior Publication Data
US 2005/0023854 A1 Feb. 3, 2005

(30) Foreign Application Priority Data
Jul. 31, 2003 (DE) ................................ 103 35 055

(51) Int. Cl.
*B60R 5/04* (2006.01)
(52) U.S. Cl. ................. 296/37.16; 296/24.43
(58) Field of Classification Search ............. 296/24.43, 296/24.4, 37.16
See application file for complete search history.

(56) References Cited

U.S. PATENT DOCUMENTS 6,843,518 B1 * 1/2005 Schlecht et al. ......... 296/24.34

FOREIGN PATENT DOCUMENTS

| DE | 19710787 | * | 4/1998 |
| DE | 200 09 327 U 1 | | 5/2000 |
| DE | 101 09 651 A 1 | | 2/2001 |
| JP | 7-149188 | * | 6/1995 |
| JP | 10-166948 | * | 6/1998 |

* cited by examiner

*Primary Examiner*—Dennis H. Pedder
(74) *Attorney, Agent, or Firm*—Crowell & Moring LLP

(57) ABSTRACT

A covering for a gap between a rear seatback and a baggage compartment covering in a vehicle which has no components permanently connection to the rear seatback is provided. The covering is implemented to slide past the front edge of the baggage compartment covering, and thus covers the gap in each position of the rear seatback. The covering has a covering flap, a hinge and a restoring device. The covering flap is linked to the front edge of the baggage compartment covering or to a hinge support attached to the baggage compartment covering using the hinge and projects forward toward the seatback. The restoring device generates an opposing force, which must be overcome by the seatback to pivot the covering flap out of the at least approximately horizontal base position over the gap.

10 Claims, 2 Drawing Sheets

COVERING FOR A GAP IN A VEHICLE

This application claims the priority of German application 103 35 055.1, filed Jul. 31, 2003, the disclosure of which is expressly incorporated by reference herein.

BACKGROUND AND SUMMARY OF THE INVENTION

The present invention relates to a covering for a gap behind a rear seatback in a vehicle, which is provided between this seatback and a baggage compartment covering in the vehicle transverse direction, and a baggage compartment covering having such a covering.

Vehicles of the station wagon construction type in particular frequently have movable and/or foldable rear seats, in order to be able to enlarge the baggage compartment. In addition, these vehicles normally have a baggage compartment covering which, in the rearmost position of the rear seat in the vehicle lengthwise direction—viewed in the direction of travel—adjoins the back of the rear seatback. At the same time, there is a gap between this seatback and the front edge of the baggage compartment covering, which is narrower or wider as a function of the position of the rear seatback in the vehicle lengthwise direction.

A covering for a gap between a rear seatback and a baggage apartment covering in a vehicle is known from DE 101 09 651 A1. The covering has a projection, positioned on the rear seatback, which is implemented so it may slide past the front edge of the baggage compartment covering and thus covers the gap in any position of the rear seatback. The projection is disadvantageously permanently connected to the rear seatback, even when the baggage compartment covering is removed from the vehicle.

One object of the present invention is to provide a covering for a gap between a rear seatback and a baggage compartment covering which has no components that are permanently connected to the rear seatback.

This object is achieved by a covering for a gap behind a seatback in a vehicle, the covering provided between the seatback and a baggage compartment located behind the seatback covering.

According to the present invention, a covering for a gap behind a rear seatback in a vehicle, which is provided between this seatback and a baggage compartment covering in the vehicle transverse direction, has a covering flap and a restoring device. The covering flap is linked—viewed in the driving direction—to the front edge of the baggage compartment covering or to a hinge support attached to the baggage compartment covering using a hinge. The restoring device produces an opposing force which must be overcome to pivot the covering flap out of the at least approximately horizontal base position, which projects toward the rear seatback. The covering flap is designed so that it may be pivoted upward or downward through the effect of force in order to expose the gap between the rear seatback and the baggage compartment covering. This is necessary in order to introduce a baggage compartment partitioning net between the rear seatback and the baggage compartment covering, for example.

The covering flap may also be designed so that, in all positions of the rear seatback, it presses against it in a more or less pivoted position. In this way, the gap is always covered with the covering flap. The restoring device always presses the covering flap against the rear seatback in this case. No part of the covering is attached to the rear seatback itself, so that the covering may be removed completely from the vehicle together with the baggage compartment covering.

The hinge is advantageously a film hinge. This is an especially simple and therefore cost-effective embodiment of a hinge. In addition, the hinge may be coated with the same material as the covering flap, so that it is practically not visually detectable.

The restoring device ideally includes a device which is attached to the covering flap and to the baggage compartment covering or to the film hinge at least essentially over its entire width. When the covering flap is pivoted out of the base position, the device is elastically deformed over its entire width, so that a pre-tension is built up as the covering flap is pivoted. The simplest conceivable achievement of the object is represented in this case by a kind of rubber band, which holds the covering flap in the base position like a type of suspenders and is stretched when the covering flap is pivoted. It is decisive for the functioning of this device that the elasticity be designed properly for the load. The special advantage of such a device is that no metallic springs are necessary.

The device advantageously includes a tension band, which is connected to the covering flap and to the baggage compartment covering or to the film hinge, an elastic intermediate element, which is elastically deformed when the covering flap is pivoted, being positioned between the tension band and the covering flap and baggage compartment covering in the region of the hinge. In this case, the elasticity of the device is primarily determined by the elastic intermediate element. The tension band itself may be made of an elastic material, but does not have to be.

Overall, the covering according to the present invention represents a cost-effective achievement of the object for gap covering which only requires a few individual parts. As an accompaniment to this, there are few sources of undesired disturbing noises. The simple construction is also insensitive to mechanical influences. The covering is visually appealing, since the design-relevant areas may be designed simply. The covering may be removed completely from the vehicle together with the baggage compartment covering, without a part remaining in the vehicle and/or on the rear seatback.

In a further embodiment of the present invention, at least two covering flaps may also be connected in series, which are each connected to one another using a hinge and a restoring device.

Other objects, advantages and novel features of the present invention will become apparent from the following detailed description of the invention when considered in conjunction with the accompanying drawings.

DETAILED DESCRIPTION OF THE DRAWINGS

Figure 1:
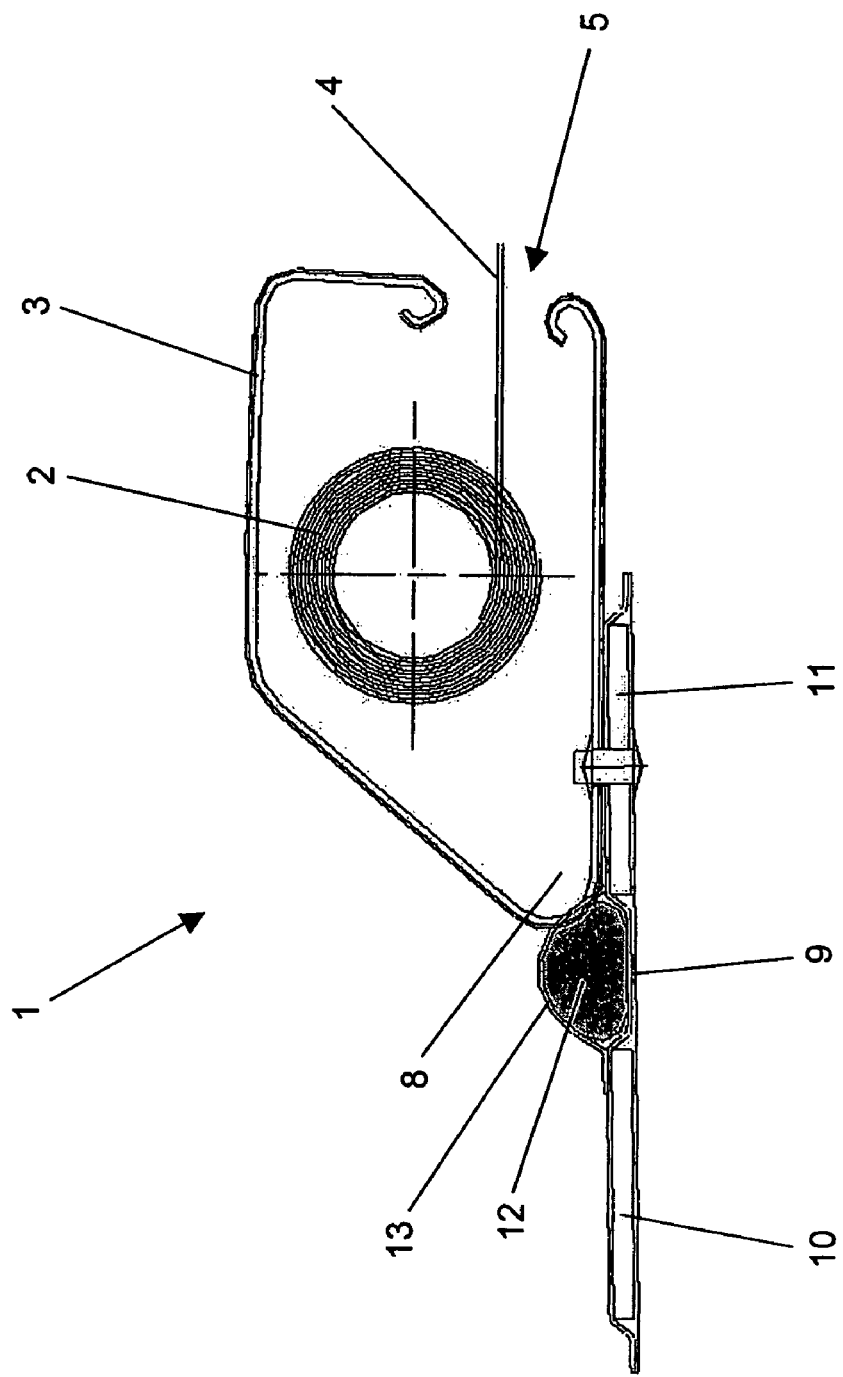
FIG. 1 schematically shows a cross-section through a baggage compartment covering having a covering for a gap between the baggage compartment covering and an adjoining rear seatback in accordance with an embodiment of the present invention.
Figure 2:
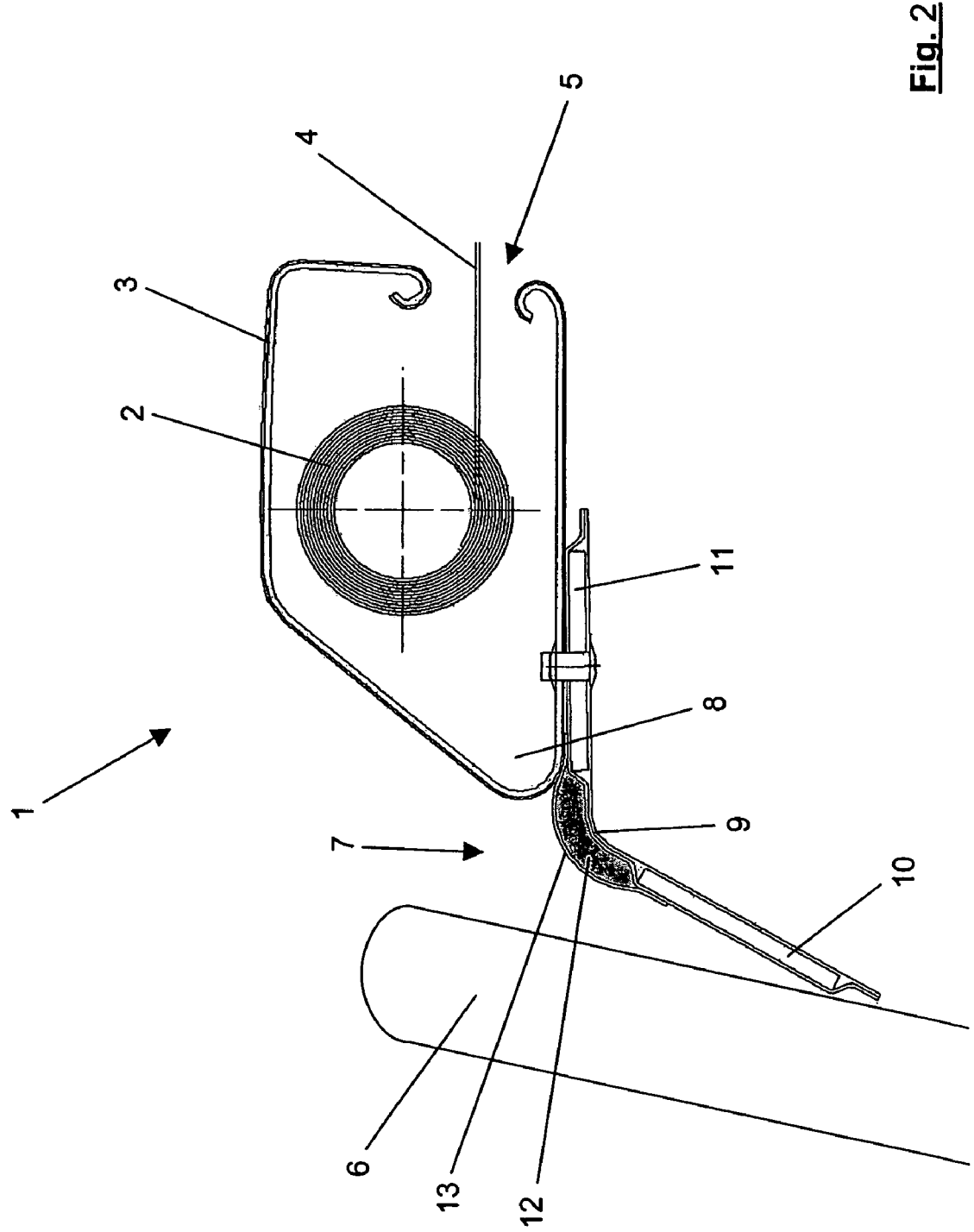
FIG. 2 schematically shows a cross-section through the baggage compartment covering from FIG. 1, the covering for the gap pressing against the rear seatback.

FIG. 1 and FIG. 2 show a baggage compartment covering 1 for a baggage compartment of a passenger vehicle of the station wagon construction type in the form of a roller blind 2, which may be rolled up in the housing 3, a free section 4 of the roller blind web which may be pulled out to the rear—viewed in the driving direction—being guided out of the housing 3 through a slot 5. The housing 3 is connected laterally to the vehicle body of the passenger vehicle and adjoins the back of a rear seatback 6. Depending on the position of the movable rear seatback 6, a bigger or smaller gap 7 arises between the baggage compartment covering 1 and the rear seatback 6.

A covering flap 10 is linked to the lower front edge 8 of the baggage compartment covering 1 via a film hinge 9. For this purpose, a hinge support 11 is riveted onto the bottom of the housing 3 of the baggage compartment covering 1. In this case, the film hinge 9 extends over the entire width of the covering flap 10. It is made of the same film with which the covering flap 10 and the hinge support 11 are coated on both sides. An elastic intermediate element 12 made of a foam is located above the film hinge 9 over its entire width. This intermediate element 12 is held there via a non-elastic tension band 13 made of a plastic film, which is connected both to the covering flap 10 and to the hinge support 11 of the baggage compartment covering 1 using a HF weld seam.

If the covering flap 10 is now pivoted around the film hinge 9, the elastic intermediate element 12 is compressed, so that a pre-tension results, which, when no other forces act on the covering flap 10, pivots the covering flap 10 back into the base position shown in FIG. 1, in which the covering flap 10 projects approximately horizontally forward from the baggage compartment covering 1. However, the base position may never be fully reached in the vehicle, since the covering flap 10 still presses against the back of the rear seatback 6 even in the forwardmost position of the rear seatback 6. At the same time, the covering flap 10 is permanently pressed against the back by the pre-tension, so that the gap 7 is visually covered. If the rear seat and/or the rear seatback 6 are displaced, the covering flap 10 is pivoted more strongly around the film hinge 9. At the same time, the intermediate element 12 is compressed further, so that the pre-tension becomes greater. In FIG. 2, the covering is shown together with the rear seatback 6, which is located in the rearmost position.

The trend in current vehicles is toward more and more individual comfort. Therefore, if two separately adjustable rear seatbacks are to be provided next to one another in a vehicle, two coverings of this type may be provided, each of which then extends over the width of the particular rear seatback.

Such a covering flap 10 also has advantages for a non-adjustable rear seatback 6, particularly if a partitioning net for partitioning off the baggage compartment may be stretched between the back of the rear seatback 6 and a vehicle roof. The covering flap 10 thus presses against the rear seatback 6, as already described, when the partitioning net is not stretched. To attach the partitioning net, the covering flap 10 may be pivoted manually against the pre-tension, so that the partitioning net may be guided through the gap 7 and stretched. When the partitioning net has been stretched out, the gap 7 may again be largely covered by the covering flap 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A covering for a gap behind a seatback in a vehicle, the covering provided between the seatback and a baggage compartment located behind the seatback covering,
wherein the covering has a covering flap which is separate from a covering free section and linked to a hinge support attached to a baggage compartment covering via a hinge, and a restoring device, which only allows the covering flap to be pivoted out of an approximately horizontal base position, projecting toward the rear seatback, by overcoming an opposing force.

2. The covering according to claim 1, wherein the hinge is a film hinge.

3. The covering according to claim 1, wherein the restoring device includes a device attached to the covering flap and to one of the baggage compartment covering and the hinge support essentially over their entire width and is elastically deformed when the covering flap is pivoted out of the base position, so that a pre-tension is built up with the pivoting of the covering flap.

4. The covering according to claim 2, wherein the restoring device includes a device attached to the covering flap and to one of the baggage compartment covering and the hinge support essentially over their entire width and is elastically deformed when the covering flap is pivoted out of the base position, so that a pre-tension is built up with the pivoting of the covering flap.

5. The covering according to claim 3, wherein the restoring device includes a tension band and an elastic intermediate element, the elastic intermediate element, which is elastically deformed when the covering flap is pivoted, being positioned adjacent to the tension band and between the covering flap and the baggage compartment covering.

6. The covering according to claim 4, wherein the restoring device includes a tension band and an elastic intermediate element, the elastic intermediate element, which is elastically deformed when the covering flap is pivoted, being positioned adjacent to the tension band and between the covering flap and the baggage compartment covering.

7. The covering according to claim 5, wherein the tension band is attached to the covering flap and to one of the baggage compartment covering and the hinge support.

8. The covering according to claim 6, wherein the tension band is attached to the covering flap and to one of the baggage compartment covering and the hinge support.

9. A baggage compartment covering comprising:
a baggage compartment cover for covering a baggage compartment behind a seatback of a vehicle; and
a covering for a gap between the seatback and the baggage compartment, wherein the covering for the gap between the seatback and the baggage compartment has a covering flap which is separate from a covering free section and linked to a hinge support attached to the baggage compartment cover via a hinge, and a restoring device, which only allows the covering flap to be pivoted out of an approximately horizontal base position, projecting toward the rear seatback, by overcoming an opposing force.

10. A covering for a gap behind a seatback in a vehicle between the seatback and a baggage compartment covering, comprising:
a covering flap;
a hinge; and
a restoring device,
wherein the covering flap is separate from a covering free section and linked to a hinge support on the baggage compartment covering via the hinge and the restoring device, such that the covering flap projects forward toward the seatback, and
wherein the restoring device constrains the covering flap to be pivoted away from a substantially horizontal position when the seatback impinges on the covering flap.

* * * * *